United States Patent
Nedeltchev et al.

(10) Patent No.: US 12,348,505 B2
(45) Date of Patent: Jul. 1, 2025

(54) BYTE CODE MONITORING TO AVOID CERTIFICATE-BASED OUTAGES

(71) Applicant: Cisco Technology, Inc., San Jose, CA (US)

(72) Inventors: Plamen Nedeltchev, San Jose, CA (US); John Buren Southerland, Sandy, UT (US)

(73) Assignee: Cisco Technology, Inc., San Jose, CA (US)

( * ) Notice: Subject to any disclaimer, the term of this patent is extended or adjusted under 35 U.S.C. 154(b) by 685 days.

(21) Appl. No.: 17/389,660

(22) Filed: Jul. 30, 2021

(65) Prior Publication Data

US 2023/0031004 A1 Feb. 2, 2023

(51) Int. Cl.
*H04L 9/40* (2022.01)

(52) U.S. Cl.
CPC ........ *H04L 63/0823* (2013.01); *H04L 63/108* (2013.01); *H04L 63/166* (2013.01); *H04L 63/20* (2013.01)

(58) Field of Classification Search
CPC . H04L 63/0823; H04L 63/108; H04L 63/166; H04L 63/20
See application file for complete search history.

(56) References Cited

U.S. PATENT DOCUMENTS

| | | | | |
|---|---|---|---|---|
| 7,512,935 B1 * | 3/2009 | Cobb | .................. | G06F 11/3466 717/130 |
| 8,346,929 B1 * | 1/2013 | Lai | ......................... | H04L 67/51 709/226 |
| 8,935,524 B1 * | 1/2015 | Lawrence | ........... | H04L 63/0823 713/156 |
| 9,118,484 B1 | 8/2015 | Naik | | |
| 11,593,780 B1 * | 2/2023 | Dai Zovi | ............ | H04W 12/069 |
| 2005/0172018 A1 * | 8/2005 | Devine | ................... | H04L 67/02 707/E17.107 |
| 2006/0048210 A1 * | 3/2006 | Hildre | ................. | H04L 63/0823 726/1 |
| 2008/0016337 A1 * | 1/2008 | Morgan | ................ | H04L 63/062 713/158 |
| 2008/0232595 A1 * | 9/2008 | Pietrowicz | ............ | H04L 9/3297 380/277 |
| 2009/0094460 A1 * | 4/2009 | Dedek | ................... | H04L 9/3247 713/180 |
| 2011/0113239 A1 | 5/2011 | Fu | | |

(Continued)

OTHER PUBLICATIONS

"Proactively Handling Certificate Expiration with ssl-cert-check"; retrieved from <http://prefetch.net/articles/checkcertificate.html> on Mar. 19, 2007; 4 pages. (Year: 2007).*

*Primary Examiner* — John B King
(74) *Attorney, Agent, or Firm* — BEHMKE INNOVATION GROUP LLC; James M. Behmke

(57) ABSTRACT

In one embodiment, a monitoring service deploys a monitoring agent to a client device. The monitoring service receives certificate information for a certificate intercepted by the monitoring agent during an online transaction. The monitoring service determines, based on the certificate information, an expiration time for the certificate intercepted by the monitoring agent. The monitoring service provides an expiration notification for display, in advance of the expiration time for the certificate.

18 Claims, 10 Drawing Sheets

(56) References Cited

U.S. PATENT DOCUMENTS

| | | | |
|---|---|---|---|
| 2013/0212663 A1* | 8/2013 | Edge | H04W 4/029 |
| | | | 726/7 |
| 2014/0196108 A1* | 7/2014 | Barr | H04L 63/20 |
| | | | 726/1 |
| 2015/0100786 A1 | 4/2015 | Xiao | |
| 2017/0171191 A1 | 6/2017 | Cignetti et al. | |
| 2017/0331854 A1* | 11/2017 | Reddy | H04L 9/30 |
| 2018/0097803 A1* | 4/2018 | Iwanir | H04L 63/14 |
| 2018/0123802 A1 | 5/2018 | Graul et al. | |
| 2019/0068580 A1* | 2/2019 | Amid | H04L 67/131 |
| 2020/0127854 A1* | 4/2020 | Mandava | G06F 21/45 |
| 2020/0236093 A1* | 7/2020 | Bannister | H04L 9/0861 |
| 2021/0044579 A1* | 2/2021 | Nelson-Gal | H04L 63/166 |
| 2021/0126801 A1* | 4/2021 | Nix | H04L 9/0861 |
| 2022/0217133 A1* | 7/2022 | Montgomery | H04L 63/0823 |

\* cited by examiner

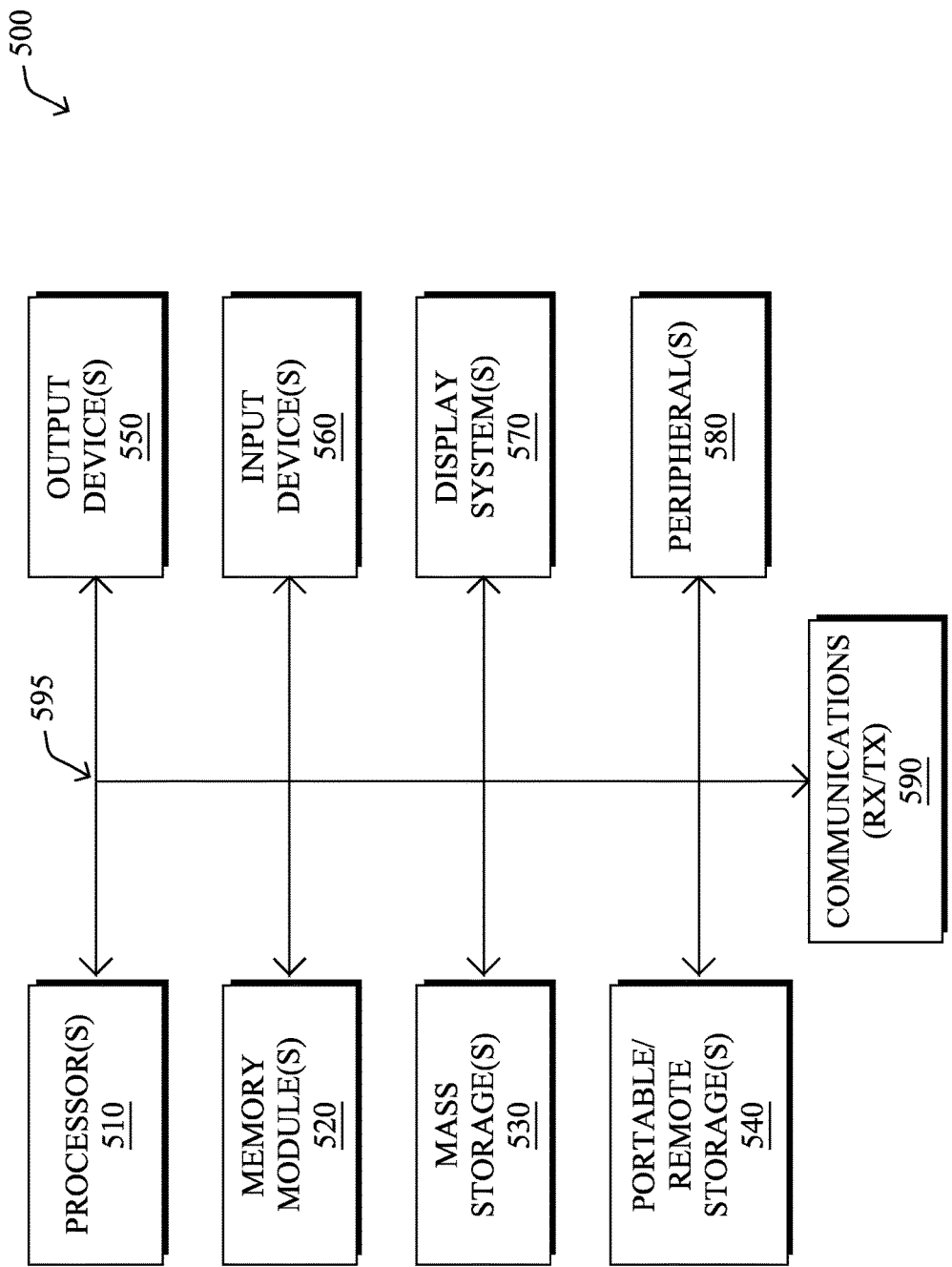

ically, to byte code monitoring to avoid certificate-based outages.

BYTE CODE MONITORING TO AVOID CERTIFICATE-BASED OUTAGES

TECHNICAL FIELD

The present disclosure relates generally to computer systems, and, more particularly, to byte code monitoring to avoid certificate-based outages.

BACKGROUND

Today, Internet Technology (IT) service management (ITSM) and IT operations management (ITOM) operate in four classical, siloed domains: application operations, infrastructure operations, network operations, and security operations. These siloed base operations typically lead to a high number of outages, due to mismatched roles and responsibilities, as well as the challenge of end-to-end orchestration. Indeed, every time a particular service crosses the boundaries of these domains, some components of the service may fall into the cracks, leading to outages that impact the resilience and service availability of an online application.

One example of a cross-silo task is the management of certificates used by an online application, particularly with respect to ensuring that the certificates are renewed in time. Here, the applications operations team may not have any information about a certificate linked to the application and only care about it working. At the same time, the infrastructure operations and network operations teams, which may have a stake in the renewal process, may not even be aware that the certificate is about to expire. Finally, the security operations team may be responsible for managing the certificate, but have no information as to how the certificate is used. As a result, certificate expirations continue to plague application providers, often resulting in application outages until the certificate is renewed.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5 illustrates an example computing system;

DESCRIPTION OF EXAMPLE EMBODIMENTS

Overview

Figure 1A:
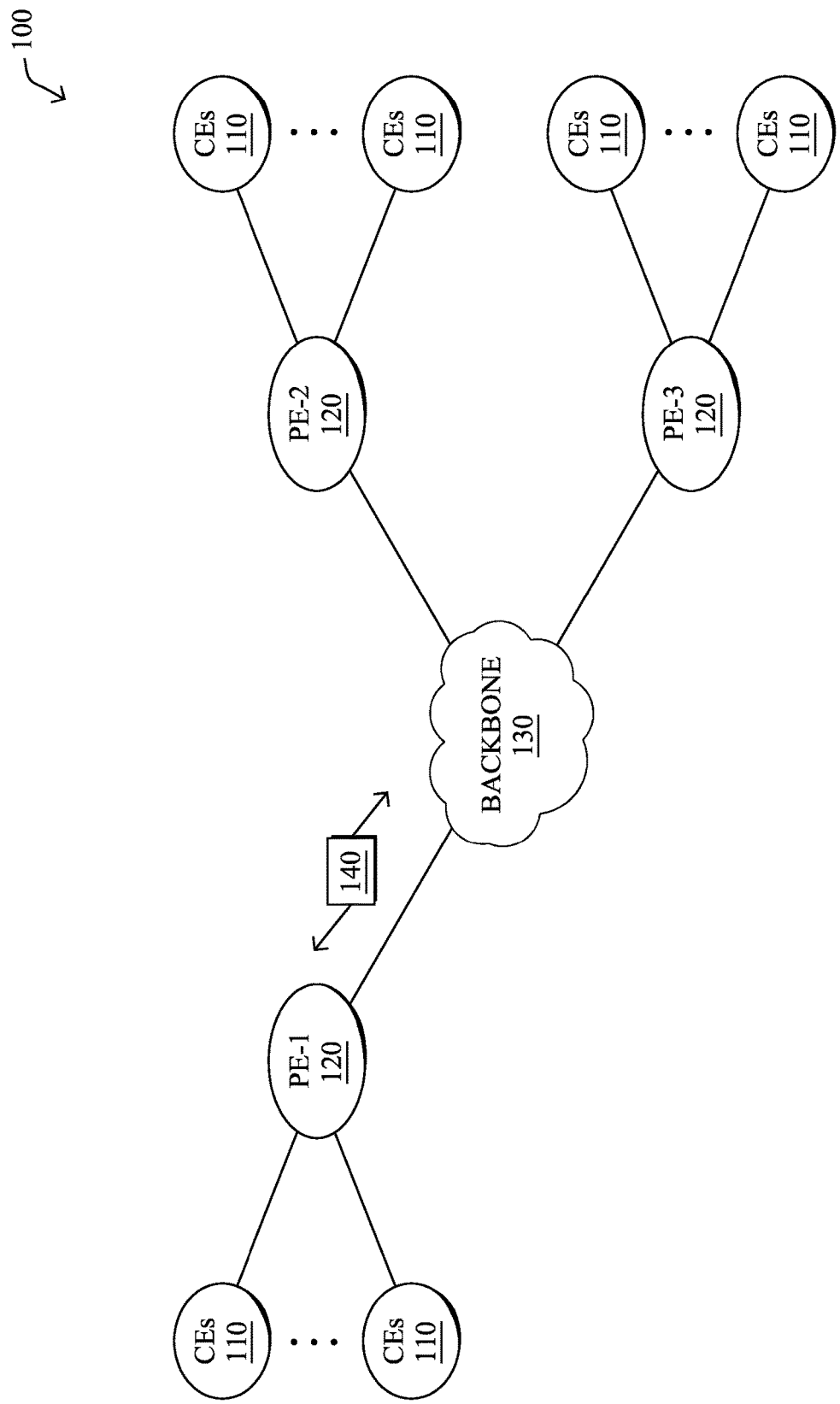
FIGS. 1A-1B illustrate an example computer network.

According to one or more embodiments of the disclosure, a monitoring service deploys a monitoring agent to a client device. The monitoring service receives certificate information for a certificate intercepted by the monitoring agent during an online transaction. The monitoring service determines, based on the certificate information, an expiration time for the certificate intercepted by the monitoring agent. The monitoring service provides an expiration notification for display, in advance of the expiration time for the certificate.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
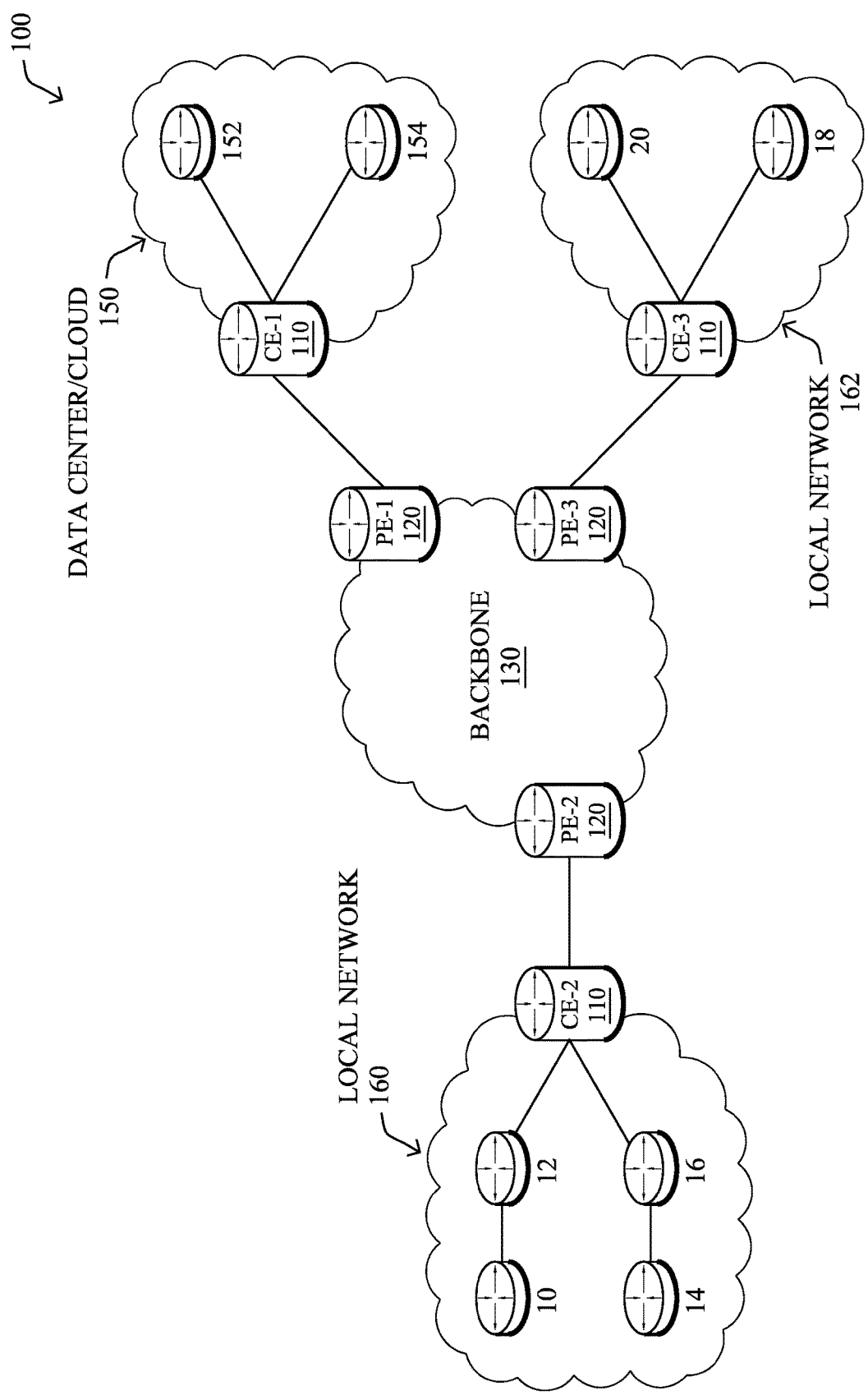

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for devices/nodes 10-16 in the local mesh, in some embodiments.

Figure 2:
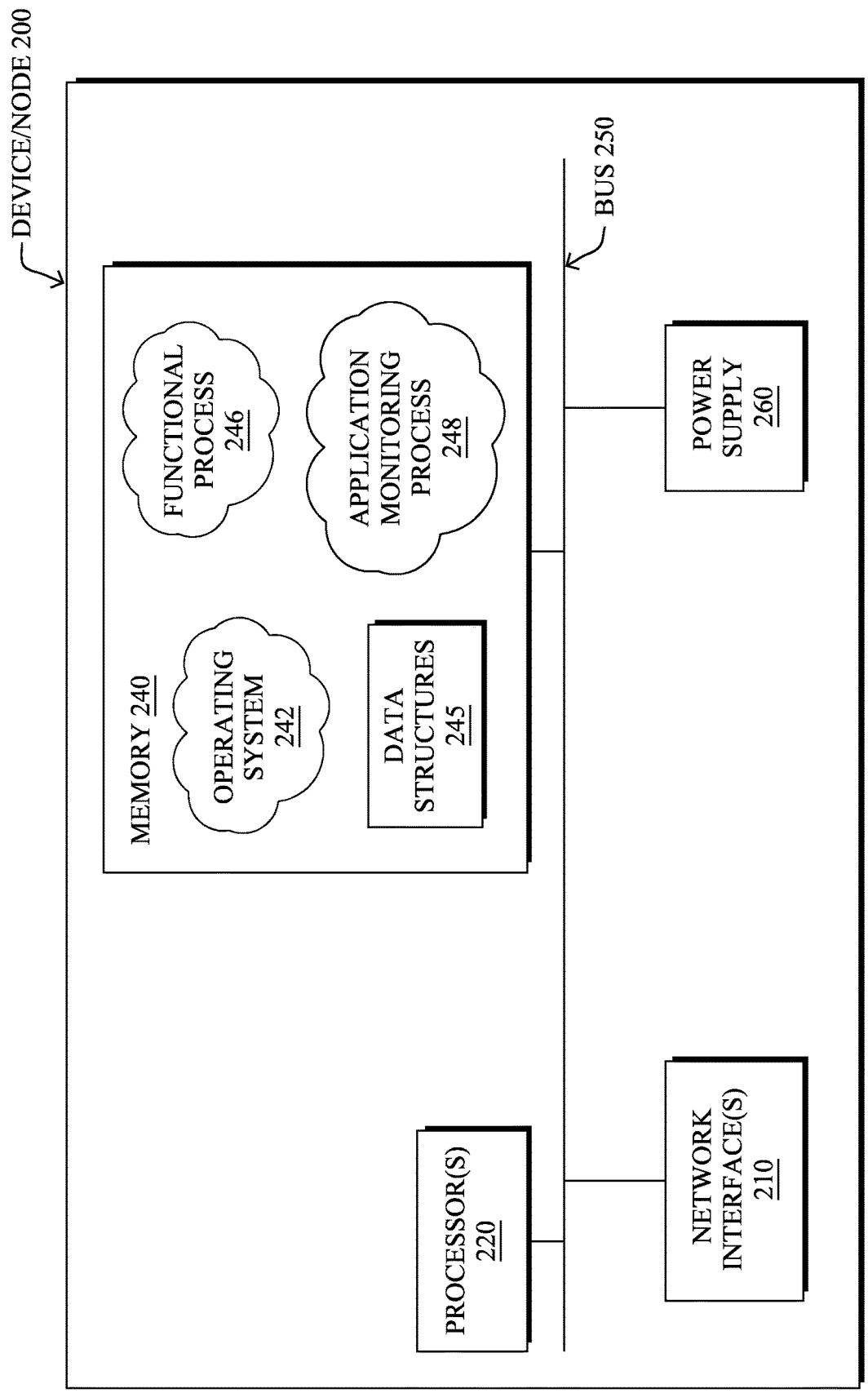
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections via network interface(s) 210, e.g., wireless and wired/physical connections, and that the view herein is merely for illustration. Also, while network interface(s) 210 are shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative monitoring process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Application Intelligence Platform—

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
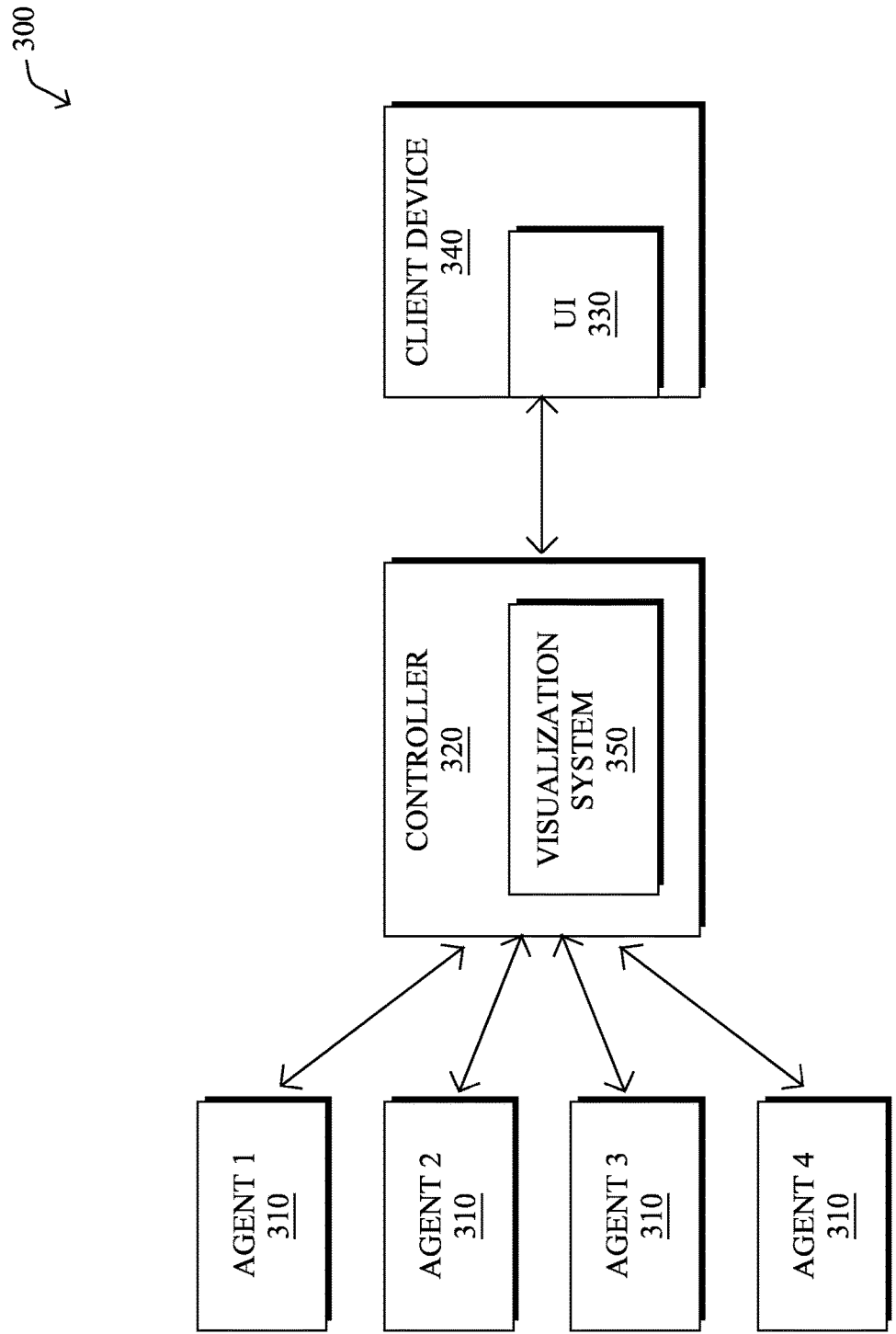
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (e.g., online transactions) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance may be hosted remotely by a provider of the application intelligence platform 300. In an illustrative on-premises (On-Prem) implementation, a controller instance may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than one hundred calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
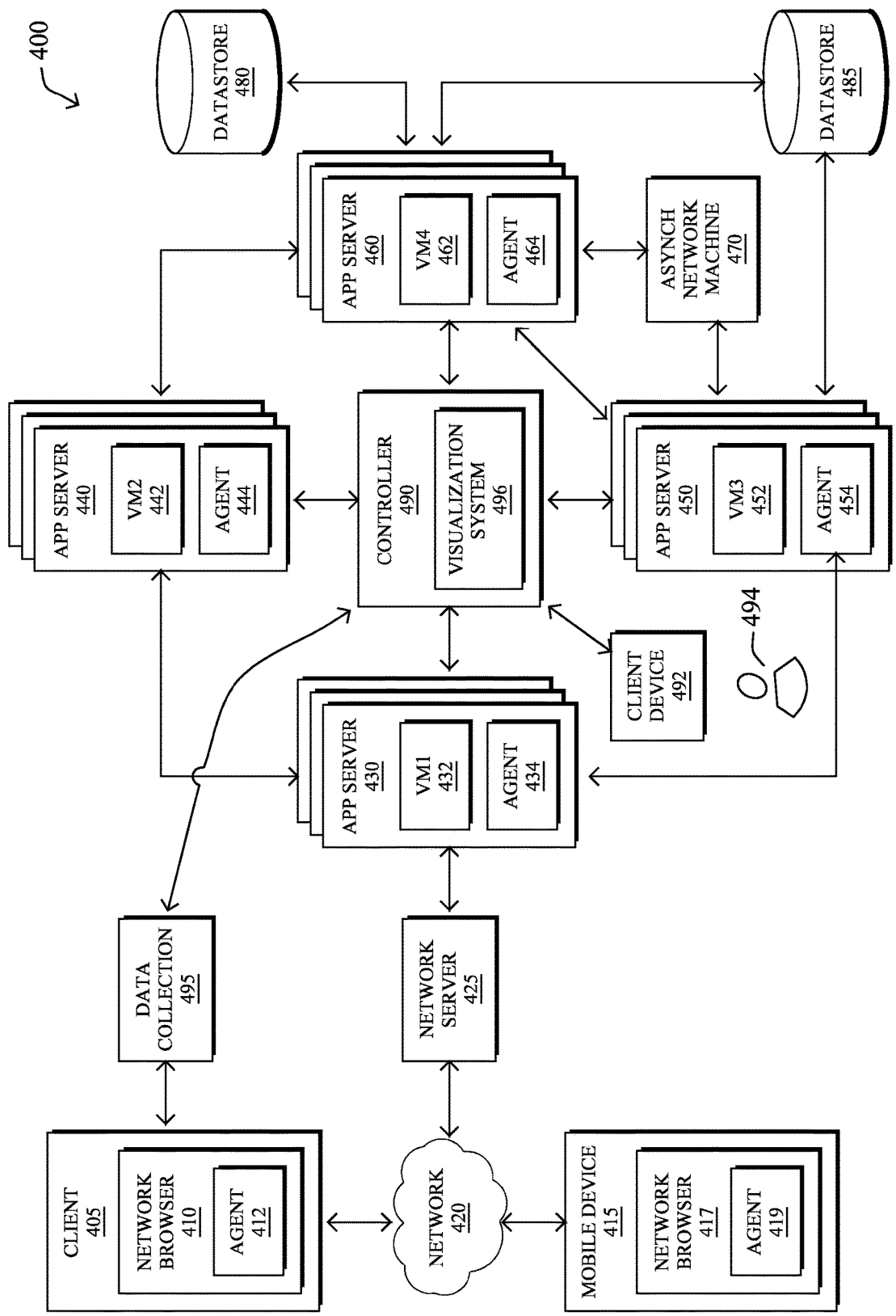
FIG. 4 illustrates an example system for implementing the example application intelligence platform.

FIG. 4 illustrates an example application intelligence platform (system) 400 for performing one or more aspects of the techniques herein. The system 400 in FIG. 4 includes client 405, client device 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection server 495, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 495 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 4). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor application 432 running in a virtual machine (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or mobile device 415 associated with a user or another source). The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 460. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 495. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client device 492 may communicate with controller 490 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

FIG. 5 is a block diagram of a computer system 500 for implementing the present technology, which is a specific implementation of device 200 of FIG. 2 above. System 500 of FIG. 5 may be implemented in the contexts of the likes of client 405, client device 492, network server 425, servers 430, 440, 450, 460, asynchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processor(s) 510 and memory 520. Main memory 520 stores, in part, instructions and data for execution by processor(s) 510. Main memory 520 can store the executable code when in operation. The system 500 of FIG. 5 further includes a mass storage device 530, portable/remote storage(s) 540, output devices 550, user input devices 560, display system(s) 570, and peripheral(s) 580.

The components shown in FIG. 5 are depicted as being connected via a single bus 590. However, the components may be connected through one or more data transport means. For example, processor(s) 510 and main memory 520 may be connected via a local microprocessor bus, and the mass storage device 530, peripheral(s) 580, storage(s) 540, and display system(s) 570 may be connected via one or more input/output (I/O) buses.

Mass storage device 530, which may be implemented with a magnetic disk drive or an optical disk drive, is a non-volatile storage device for storing data and instructions for use by processor(s) 510. Mass storage device 530 can store the system software for implementing embodiments of the present disclosure for purposes of loading that software into main memory 520.

Portable/remote storage(s) 540 may operate in conjunction with a portable non-volatile storage medium, such as a compact disk, digital video disk, magnetic disk, flash storage, etc. to input and output data and code to and from the computer system 500 of FIG. 5. The system software for implementing embodiments of the present disclosure may be stored on such a portable medium and input to the computer system 500 via the storage(s) 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system(s) 570 may include a liquid crystal display (LCD) or other suitable display device. Display system(s) 570 receives textual and graphical information, and processes the information for output to the display device.

Peripheral(s) 580 may include any type of computer support device to add additional functionality to the computer system. For example, peripheral(s) 580 may include a modem or a router.

The components contained in the computer system 500 of FIG. 5 can include a personal computer, hand-held computing device, telephone, mobile computing device, workstation, server, minicomputer, mainframe computer, or any other computing device. The computer can also include different bus configurations, networked platforms, multiprocessor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

—Byte Code Monitoring to Avoid Certificate-Based Outages—

As noted above, Internet Technology (IT) service management (ITSM) and IT operations management (ITOM) operate in four classical, siloed domains: application operations, infrastructure operations, network operations, and security operations. These siloed base operations typically lead to a high number of outages, due to mismatched roles and responsibilities, as well as the challenge of end-to-end orchestration. Indeed, every time a particular service crosses the boundaries of these domains, some components of the service may fall into the cracks, leading to outages that impact the resilience and service availability of an online application.

One example of a cross-silo task is the management of certificates used by an online application, particularly with respect to ensuring that the certificates are renewed in time. Here, the application operations team, which is the major user of the actual certificates, typically has nothing to do with certificate requests, renewal, or installation. Information security may also be busy managing the certificate authority and not receive notifications that are particularly relevant. Conversely, infrastructure operations and network operations teams may be responsible for managing and addressing certificate expiration, sometimes 'flying blind' as to the actual expirations.

By way of example, consider the following chain of events:
1. An applications operations team member may request a new certificate on behalf of the application team.
2. A certificate signing request (CSR) is then sent for signature to the certificate authority (CA).
3. The signed certificate is then sent back to the security operations team, which the certificate name (CN), contact name, and email alias in the Public Key Infrastructure (PKI) database reflecting the credentials of the security operations teams or a specific team member.
4. The certificate is then returned to the operational team.
5. The operational team then installs the new certificate and begins tracking the expiration time for the certificate (e.g., the specific day, hour, minute, and/or second, etc.).
6. As time advances, the certificate will approach its expiration.
7. At a certain amount of time in advance of the expiration of the certificate (e.g., 90 days in advance, 60 days in advance, 30 days in advance, etc.), a reminder may be sent out to the contact name in the PKI database.
8. At the same time, the operational team may monitor the expiration of the certificate.
9. If the operational team is able to identify the application owner of the certificate, and if the application operations team is willing to pay for a certificate renewal, a new CSR may be sent to be signed by the CA for renewal.
10. In conjunction with the certificate renewal, the old certificate may also be revoked, optionally.

From the above, it can be seen that there are a number of failure points in the process. Here, the different siloed teams may interact as follows:

The security operations team manages Secure Socket Layer (SSL)/Transport Layer Security (TLS) certificates and has no actual information about which certificate is being used for which application. They just send a notification to the requestor who may not be in the same role any longer, is not with the company, or not available to respond. Auto-renewal may not be available since there is an approval and payment process associated.

The application operations team also does not have information about which certificate is being linked to which application. They also typically have no responsibility in the process and just want the certificates to work.

The infrastructure operations and network operations teams, which typically request, install, and renew certificates, also typically fail to receive expiration notifications directed to the name of the person listed for the certificate, who may not be available, moved to a new role, or has left the company.

As are result, certificate expiration notifications today are of little value in many organizations, as they fail to make their way to their appropriate recipients, resulting in an expiration of the certificate. When that happens, the applications team becomes frustrated that they cannot accept network connections, infrastructure and network operations teams are frustrated that they did not know who to notify, and the security operations teams are frustrated that they have to deal with expired certificates, while unaware of their usage and management.

The techniques herein, therefore, introduce mechanisms to change from an active monitoring approach for certificate expirations to a passive one whereby memory signatures for a certificate are identified by a monitoring agent. In turn, certificate information (e.g., an expiration timestamp, etc.) can be captured by the agent and used to drive certificate expiration notifications. This shifts the monitoring of certificates from a server-side burden to a client-side passive monitoring approach. In some aspects, this shift alerts client systems to a possible failure of a downstream server system due to operational oversight and requires no further configuration for the clients other than to install a client-hosted agent. This approach is intentionally passive in its nature, yet captures many more monitoring use cases, and puts the communication of an impending failure into the hands of the user of a remote service, rather than an operational accountant figure of the server side, which may not be as motivated to action as the user.

Specifically, according to one or more embodiments described herein, a monitoring service deploys a monitoring agent to a client device. The monitoring service receives certificate information for a certificate intercepted by the monitoring agent during an online transaction. The monitoring service determines, based on the certificate information, an expiration time for the certificate intercepted by the monitoring agent. The monitoring service provides an expiration notification for display, in advance of the expiration time for the certificate.

Operationally, in various embodiments, the techniques herein propose leveraging byte code monitoring, such as the byte code monitoring in Java available through the— javaagent, which is typically used for purposes of application performance monitoring. In some embodiments, the same injection method can be used to monitor for operational use cases, such as the expiration of SSL/TLS certificates that are loaded into memory.

Indeed, certificate management is typically outside of the scope of an APM system. Still, SSL and TLS certificates are still being used in the server-client authentications and communications. This is particularly true in the case of lad balancing systems, which can include servers, routers, applications, etc. that can be hosted on network applications through the use of virtual machines (VMs) or containers. Typically, a large enterprise manages close to 10,000 certificates and, based on their specific use, a variety of certificate management solutions are available.

In various embodiments, the APM agent running the certificate interception code may be loaded into the Java process (or other programming language), and by virtue of initial configuration, is aware of the application, component, and node to which it is associated. This means that the agent can monitor not only the application server's certificate (e.g., the primary server to which the client device connects), but also any certificates for any downstream servers/certificates, as well. As a result, the agent is able to monitor not only the certificate that the operations team for the application has control over, but also any certificates involved in the entire business transaction, at all (e.g., salesforce.com certificates, etc.). This is a departure from existing certificate monitoring point solutions because those systems are not aware of the business context of the certificates they are registered to monitor.

A unique ability of the APM service is its ability to link the health of the application to business transactions. Accordingly, during the validation cycle of the certificate, the APM service will know the context of the business transaction, whether it is a process to log the user into an application or website, update a ticket description, or the like. Thus, in various embodiments, the APM service may be able to associate the application, component, node, certificate, and/or business transaction with one another, The service can then use this information to determine the criticality of a particular certificate expiring, such as based in part on the impact of any outages that this may cause.

Since the APM service is already tied into the application itself and is used by the application operations team, this allows the APM service to provide certificate expiration notifications directly to the people responsible. In other words, the techniques herein are able to cut out the middle people and teams typically involved in the certificate renewal process.

The byte code monitoring introduced herein also has the ability to discover complex configuration failures downstream, in some embodiments. Indeed, it is common that a single certificate may be loaded onto hundreds of farm servers in a cluster or a behind a load balancer. If just one of those servers fails to have an updated certificate loaded during a certificate update by operations, most other certificate monitoring techniques would fail to identify the issue when only one certificate is not updated in a cluster. For instance, assume that there are one hundred servers to update and that one of them fails to receive the update. An external monitoring tool would only have a P(0.01) chance of identifying the configuration error. This agent approach would immediately identify the first failure or even early likelihood of failure about to happen in x-number of days when the certificate is validated and much too close to expiration, based on the example given above in code. This is making use of the existing APM use cases where many successes may hide a subtle failure which will soon have a much larger impact, if not actioned upon.

Figure 6A:
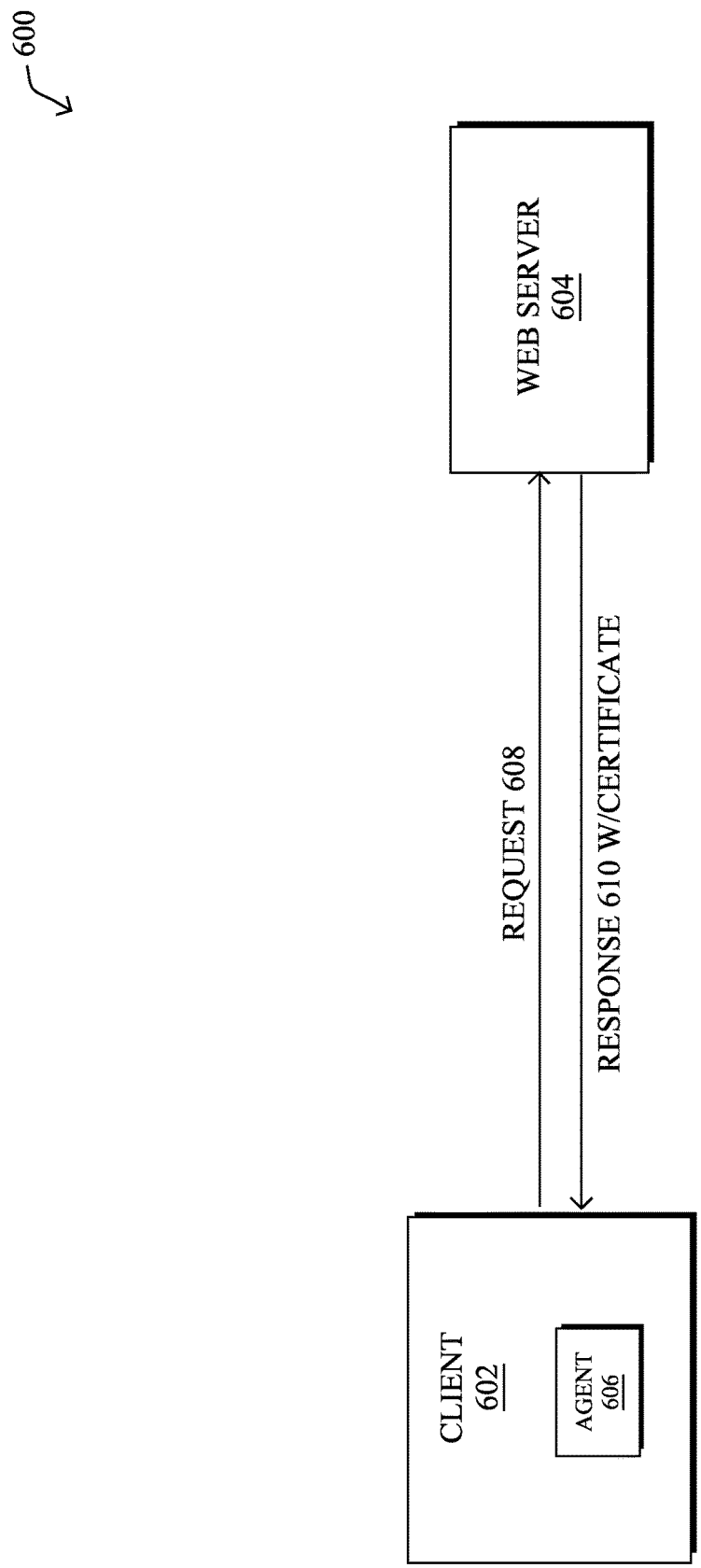
FIGS. 6A-6C illustrate an example of sending an agent-assisted certificate expiration notification.
Figure 6B:
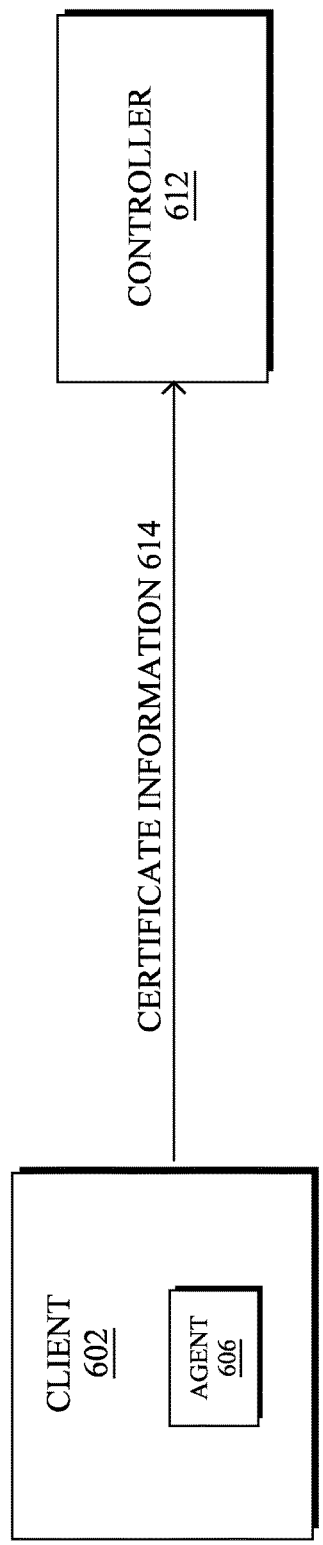
Figure 6C:
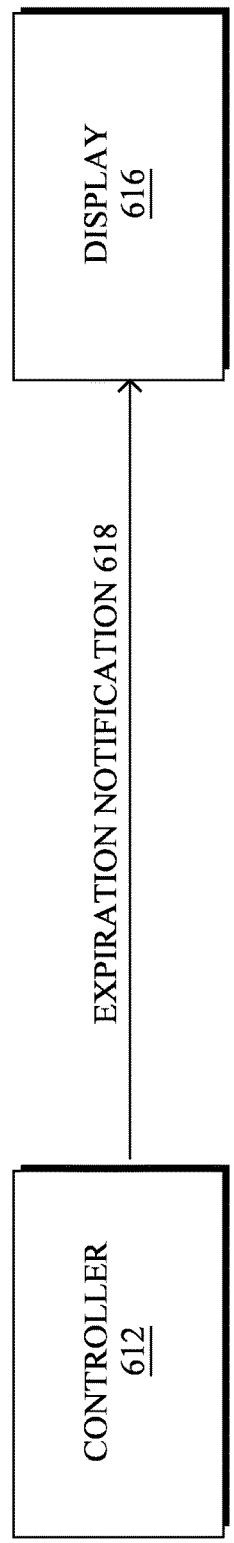

FIGS. 6A-6C illustrate an example 600 of the sending an agent-assisted certificate expiration notification, according to various embodiments. As shown in FIG. 6A, assume that there is a client 602, such as client 405 or mobile device 415 described previously with respect to FIG. 4. In addition, also assume that there is a web server 604. For instance, web server 604 may host an online application or other service that client 602 may access, remotely.

As shown, client 602 may also execute a monitoring agent 606 that has been deployed to it. For instance, monitoring agent 606 may take the form of agent 412 or agent 419 in FIG. 4, described previously. In general, monitoring agent 606 may be an APM agent that is configured to monitor the performance of online applications, such as the application served by web server 604.

First, 602 may send a request 608 to web server 604 via the network, to access the online application. Typically, request 608 may take the form of a Hypertext Transfer Protocol Secure (HTTPS) request. Thus, request 608 may be sent as part of a handshake operation between client 602 and web server 604, to establish a secure connection between the two.

In response to request 608, web server 604 may return response 610 to client 602 with its own handshake information. As would be appreciated, response 610 may also include a signed certificate associated with the online application served by web server 604.

According to various embodiments, a key function of agent 606 deployed to client 602 is to intercept the certificate from response 610 in memory. This allows monitoring agent 606 to capture certificate information for the certificate, such as its subject name, expiration time (e.g., date, hour, minute, etc.), owner or user, issuer, CA, combinations thereof, or the like. For instance, agent 606 may utilize the following interceptor rule to intercept the certificate of response 610, in some embodiments:

```
new Rule.Builder(
java.security.cert.X509Certificate").classMatchType(SDKClassMatchType.INHE
RITS_FROM_CLASS).methodMatchString("checkValidity").build( )
```

In addition to the transaction performed with the primary web server 604, such as the initial login transaction of the user, monitoring agent 606 may likewise capture any subsequent certificates sent to client 602 by any downstream servers/services. Indeed, while web server 604 may send its own certificate to client 602 as part of its serving of an online application, there may also be other servers that send certificates to client 602 during the session, as well. Accordingly, monitoring agent 606 may intercept any of these certificates, as well, and extract their certificate information, in a similar manner.

As shown in FIG. 6B, monitoring agent 606 may send its captured certificate information 614 to a controller 612 for storage and alerting, in various embodiments. For instance, controller 612 may take the form of an APM controller, such as controller 490 described previously with respect to FIG. 4. For instance, monitoring agent 606 may execute the following code, to capture and report certificate information 614 to server 612, in some embodiments:

```
X509Certificate cert = (X509Certificate) object;
MetricPublisher metricPublisher = APMAgent.getMetricPublisher( );
long daysToExpiration = ChronoUnit.DAYS.between(LocalDate.now( ), new
java.sql.Timestamp(cert.getNotAfter( ).getTime( )).toLocalDateTime( ));
   String subject = cert.getSubjectX500Principal( ).getName( );
   metricPublisher.reportObservedMetric("SSL Certificates|" + subject + "|Days To
Expiration", daysToExpiration);
   getLogger( ).info("SSLCertificateInterceptor published metric: Custom
Metrics|SSL Certificates|" + subject + "|Days To Expiration = " + daysToExpiration);
   if (daysToExpiration <= 2) {
      APMAgent.getTransaction( ).markAsError(
         "This transaction has not failed due to this, but will in less than " +
daysToExpiration + (daysToExpiration == 1 ? " day. " : " days. ") +
         " Please contact the owner of certificate with subject: " + subject + "and
inform them that updates are required ASAP!");
      Map<String, String> eventInfoMap = new HashMap<>( );
      eventInfoMap.put("SSL Certificate Subject",subject);
      eventInfoMap.put("Days To Expiration", String.valueOf(daysToExpiration));
      APMAgent.getEventPublisher( ).publishEvent("SSL Certificate Expiration",
"ERROR", "APPLICATION_ERROR", eventInfoMap);}
```

As shown in FIG. 6C, controller 612 may determine the expiration time of the certificate from the reported certificate information 614 and provide an expiration notification 618 for display by a display 616. In various embodiments, controller 612 may send expiration notification 618 based on any or all of the following:

The owner or user associated with the certificate.
The amount of time until the expiration of the certificate. For instance, controller 612 may send expiration notification 618 at a predefined amount of time before the expiration of the certificate (e.g., one month in advance, etc.).
The criticality of the certificate. In various embodiments, controller 612 may associate the certificate and its expiration with the business/online transaction(s) and/ or application in which it is used, to determine how critical the certificate is. In other word, controller 612 may determine the impact of the certificate expiring, to drive its sending of expiration notification 618.

Based on any or all of the above, controller 612 may provide expiration notification 618 to the appropriate person or team. For instance, by determining that the certificate is associated with business transaction 'B' within application 'A,' controller 612 may send expiration notification 618 to one or more application operations personnel associated with it.

In some embodiments, controller 612 may also provide expiration notification 618 multiple times for display, such as at predefined intervals, which may also increase in frequency as it gets closer to the expiration of the certificate. For instance, expiration notification 618 may be sent at the 90-day, 60-day, and 30-day marks, then increasing in frequency to weekly or even daily, prior to the expiration time. Of course, acknowledgement expiration notification 618 may also prevent controller 612 from sending any additional reminders, such as when the certificate is renewed.

In a further embodiment, controller 612 may also employ an anomaly detection or machine learning mechanism, as a last resort. Such a mechanism may capture the flood of rejected access to certificate-based resources, to detect and notify the proper team as to the expired certificate or to automatically generate a critical emergency case.

In summary, the techniques herein propose using byte code monitoring, typically designed for application performance monitoring, for alerting when critical certificates are going to expire. In some aspects, this could be achieved using Java-based byte code monitoring through the java.security.cert.X509Certificate abstract class. Through this, the correct owner or user of the certificate can also be identified with its expiration, to send notifications to the correct people. This can be achieved through configuration of an existing ITSM system or added to another database that manages the entire certification process. A further key aspect of the techniques herein is the ability for the monitoring service to determine the impact of the expiration of the certificate to business transactions.

In closing, example simplified procedure for instrumenting and optimizing a microservice-based application, in accordance with one or more embodiments described herein. For example, a non-generic, specifically configured device (e.g., device 200) may perform procedure 700 by executing stored instructions (e.g., process 248, such as a monitoring process), to provide a monitoring service to a network. As shown, procedure 700 may start at step 705 and continue on to step 710 where, as described in greater detail above, the monitoring service may deploy a monitoring agent to a client device (e.g., a mobile device, a computer, a tablet, etc.). In various embodiments, the monitoring service may do so directly or indirectly, such as providing the agent to another device or service that installs the agent to the client.

At step 715, as described in greater detail above, the monitoring service may receive certificate information for a certificate intercepted by the monitoring agent during an online transaction. For instance, the certificate may be sent to the client device as part of a handshake response by a primary application server or may be sent by a downstream server during the online transaction. In general, the certificate information may include any information that can be captured by the monitoring agent regarding the certificate, such as its expiration information, ownership, etc.

At step 720, the monitoring service may determine an expiration time for the certificate intercepted by the monitoring agent, as described in greater detail above. In some instance, the monitoring service may do so by assessing a reporting expiration timestamp in the certificate information. In other cases, the monitoring agent may provide the calculated amount of time until expiration to the monitoring service, as part of the certificate information.

At step 725, as detailed above, the monitoring service may provide an expiration notification for display, in advance of the expiration time for the certificate. In various embodiments, the monitoring service may use the received certificate information to identify the appropriate recipient(s) for the notification, such as based on the application or transaction associated with the certificate. In some embodiments, the monitoring service may also send the notification based in part on a determined criticality for the certificate, such as whether expiration of the certificate will cause a critical outage.

The simplified procedure 700 may then end in step 730, notably with the ability to continue ingesting and processing data. Other steps may also be included generally within procedure 700.

Figure 7:
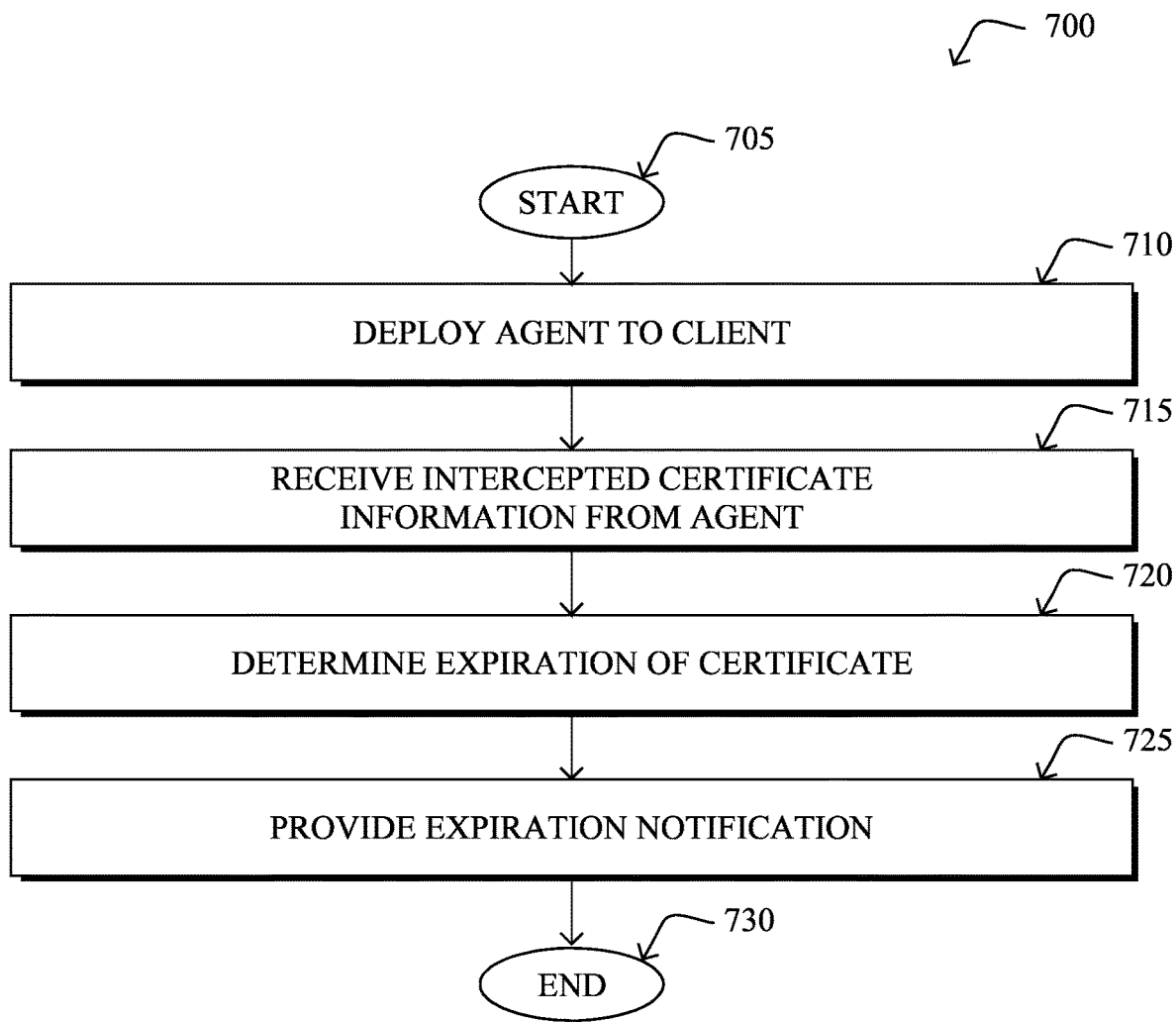
FIG. 7 illustrates an example simplified procedure for sending a certificate expiration notification.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Illustratively, the techniques described herein may be performed by hardware, software, and/or firmware, such as in accordance with the illustrative application monitoring process 248, or another Java agent, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

According to the embodiments herein, a method herein may comprise: deploying, by a monitoring service, a monitoring agent to a client device; receiving, at the monitoring service, certificate information for a certificate intercepted by the monitoring agent during an online transaction; determining, by the monitoring service and based on the certificate information, an expiration time for the certificate intercepted by the monitoring agent; and providing, by the monitoring service, an expiration notification for display, in advance of the expiration time for the certificate.

In one embodiment, the monitoring agent intercepts the certificate from a handshake response sent to the client device by a primary application server. In another embodiment, the monitoring agent intercepts the certificate from a downstream application server during the online transaction. In a further embodiment, the certificate information indicates a publisher of the certificate and an amount of time until the expiration time for the certificate. In yet another embodiment, the monitoring agent uses Java byte code monitoring to intercept the certificate and send the certificate information to the monitoring service. In another embodiment, the method further comprises associating the online transaction with the certificate. In yet another embodiment, the method may also include determining a degree of criticality for the expiration time, based in part on the online transaction associated with the certificate, wherein the expiration notification indicates the degree of criticality. In some embodiments, the method also includes re-providing the expiration notification for display, according to a schedule that increases in frequency over time. In yet another embodiment, the certificate information indicates an owner or user of the certificate, and wherein the expiration notification is provided to that owner or user. In a further embodiment, the certificate is a Secure Socket Layer (SSL) or Transport Layer Security (TLS) certificate.

According to the embodiments herein, a tangible, non-transitory, computer-readable medium storing program instructions that cause a monitoring service to execute a process comprising: deploying, by the monitoring service, a monitoring agent to a client device; receiving, at the monitoring service, certificate information for a certificate intercepted by the monitoring agent during an online transaction; determining, by the monitoring service and based on the certificate information, an expiration time for the certificate intercepted by the monitoring agent; and providing, by the monitoring service, an expiration notification alert for display, in advance of the expiration time for the certificate.

Further, according to the embodiments herein an apparatus is disclosed comprising: one or more network interfaces; a processor coupled to the one or more network interfaces and configured to execute one or more processes; and a memory configured to store a process that is executable by the processor, the process when executed configured to: deploy a monitoring agent to a client device; receive certificate information for a certificate intercepted by the monitoring agent during an online transaction; determine, based on the certificate information, an expiration time for the certificate intercepted by the monitoring agent; and provide an expiration notification for display, in advance of the expiration time for the certificate.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller," those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
deploying, by a monitoring service at a controller for an application intelligence platform, a monitoring agent of the application intelligence platform to a client device;
receiving, at the monitoring service, certificate information for a certificate intercepted by the monitoring agent during an online transaction that is distributed over application servers, wherein the monitoring agent uses Java byte code monitoring to intercept the certificate and send the certificate information to the monitoring service;
determining, by the monitoring service and based on the certificate information, an expiration time for the certificate intercepted by the monitoring agent; and
providing, by the monitoring service, an expiration notification for display, in advance of the expiration time for the certificate.

2. The method as in claim 1, wherein the monitoring agent intercepts the certificate from a handshake response sent to the client device by a primary application server of the application servers.

3. The method as in claim 1, wherein the monitoring agent intercepts the certificate from a downstream application server during the online transaction of the application servers.

4. The method as in claim 1, wherein the certificate information indicates a publisher of the certificate and an amount of time until the expiration time for the certificate.

5. The method as in claim 1, further comprising:
associating the online transaction with the certificate.

6. The method as in claim 5, further comprising:
determining a degree of criticality for the expiration time, based in part on the online transaction associated with the certificate, wherein the expiration notification indicates the degree of criticality.

7. The method as in claim 1, further comprising:
re-providing the expiration notification for display, according to a schedule that increases in frequency over time.

8. The method as in claim 1, wherein the certificate information indicates an owner or user of the certificate, and wherein the expiration notification is provided to that owner or user.

9. The method as in claim 1, wherein the certificate is a Secure Socket Layer (SSL) or Transport Layer Security (TLS) certificate.

10. An apparatus comprising a controller device for an application intelligence platform, comprising:
one or more network interfaces;
a processor coupled to the one or more network interfaces and configured to execute one or more processes; and
a memory configured to store a process that is executable by the processor, the process when executed configured to:
deploy a monitoring agent to a client device;
receive certificate information for a certificate intercepted by the monitoring agent during an online transaction that is distributed over application servers, wherein the monitoring agent uses Java byte code monitoring to intercept the certificate and send the certificate information to the apparatus;
determine, based on the certificate information, an expiration time for the certificate intercepted by the monitoring agent; and
provide an expiration notification for display, in advance of the expiration time for the certificate.

11. The apparatus as in claim 10, wherein the monitoring agent intercepts the certificate from a handshake response sent to the client device by a primary application server of the application servers.

12. The apparatus as in claim 10, wherein the monitoring agent intercepts the certificate from a downstream application server during the online transaction of the application servers.

13. The apparatus as in claim 10, wherein the certificate information indicates a publisher of the certificate and an amount of time until the expiration time for the certificate.

14. The apparatus as in claim 10, wherein the process when executed is further configured to:
associate the online transaction with the certificate.

15. The apparatus as in claim 14, wherein the process when executed is further configured to:
determine a degree of criticality for the expiration time, based in part on the online transaction associated with the certificate, wherein the expiration notification indicates the degree of criticality.

16. The apparatus as in claim 10, wherein the process when executed is further configured to:
re-provide the expiration notification for display, according to a schedule that increases in frequency over time.

17. The apparatus as in claim 10, wherein the certificate information indicates an owner or user of the certificate, and wherein the expiration notification is provided to that owner or user.

18. A tangible, non-transitory, computer-readable medium storing program instructions that cause a monitoring service at a controller for an application intelligence platform to execute a process comprising:
deploying, by the monitoring service, a monitoring agent of the application intelligence platform to a client device;
receiving, at the monitoring service, certificate information for a certificate intercepted by the monitoring agent during an online transaction that is distributed over application servers, wherein the monitoring agent uses Java byte code monitoring to intercept the certificate and send the certificate information to the monitoring service;
determining, by the monitoring service and based on the certificate information, an expiration time for the certificate intercepted by the monitoring agent; and
providing, by the monitoring service, an expiration notification alert for display, in advance of the expiration time for the certificate.

\* \* \* \* \*